(12) United States Patent
Singh

(10) Patent No.: US 8,879,222 B2
(45) Date of Patent: Nov. 4, 2014

(54) TRIGGER CIRCUIT AND METHOD OF USING SAME

(71) Applicant: STMicroelectronics International N.V., Amsterdam (NL)

(72) Inventor: Gaurav Singh, Uttar Pradesh (IN)

(73) Assignee: STMicroelectronics International N.V., Amsterdam (NL)

( * ) Notice: Subject to any disclaimer, the term of this patent is extended or adjusted under 35 U.S.C. 154(b) by 14 days.

(21) Appl. No.: 13/626,131

(22) Filed: Sep. 25, 2012

(65) Prior Publication Data

US 2013/0170081 A1 Jul. 4, 2013

(30) Foreign Application Priority Data

Dec. 28, 2011 (IN) .......................... 3848/DEL/2011

(51) Int. Cl.
- *H02H 9/00* (2006.01)
- *H02H 3/20* (2006.01)
- *H02H 9/04* (2006.01)
- *H02H 3/22* (2006.01)

(52) U.S. Cl.
USPC ............. 361/56; 361/91.1; 361/111; 361/118

(58) Field of Classification Search
USPC .................................. 361/56, 91.1, 111, 118
See application file for complete search history.

(56) References Cited

U.S. PATENT DOCUMENTS

| 5,835,328 | A * | 11/1998 | Maloney et al. ............... 361/111 |
| 7,027,275 | B2 * | 4/2006 | Smith ............................. 361/56 |
| 7,102,862 | B1 * | 9/2006 | Lien et al. ...................... 361/56 |
| 7,106,563 | B2 * | 9/2006 | Lai et al. ......................... 361/56 |
| 7,133,300 | B1 * | 11/2006 | Yang .......................... 363/56.11 |
| 7,164,565 | B2 * | 1/2007 | Takeda .......................... 361/56 |
| 7,196,890 | B2 * | 3/2007 | Smith .......................... 361/91.1 |
| 7,397,641 | B2 * | 7/2008 | Chu et al. ........................ 361/56 |
| 7,545,614 | B2 * | 6/2009 | Traynor et al. ................. 361/56 |
| 7,570,468 | B2 * | 8/2009 | Bernard et al. ................. 361/56 |
| 7,808,754 | B2 * | 10/2010 | Jang ................................. 361/56 |
| 7,929,263 | B1 * | 4/2011 | Peachey et al. ................. 361/56 |
| 8,369,054 | B2 * | 2/2013 | Cai et al. ......................... 361/56 |
| 8,400,742 | B2 * | 3/2013 | Lai et al. ......................... 361/56 |
| 8,514,532 | B2 * | 8/2013 | Worley et al. ................... 361/56 |

(Continued)

OTHER PUBLICATIONS

Li, J. et al., "Design and Characterization of a Multi-RC-Triggered MOSFET-Based Power Clamp for On-Chip ESD Protection," EOS/ESD Symposium 06-179, Sep. 10-15, 2006, 7 pp.

(Continued)

*Primary Examiner* — Jared Fureman
*Assistant Examiner* — Christopher Clark
(74) *Attorney, Agent, or Firm* — Slater & Matsil, L.L.P.

(57) ABSTRACT

A circuit includes a discharge arrangement configured to discharge an electrostatic charge. The discharge arrangement has a discharge state. A first circuit is configured to provide a pulse to the discharge arrangement when the electrostatic charge is sensed. The pulse causes the discharge arrangement to enter the discharge state. A second circuit is configured to maintain the discharge arrangement in the discharge state after the pulse has ended. A third circuit is configured to receive the pulse and to provide a delayed output to the discharge arrangement. The delayed output causes the discharge arrangement to exit the discharge state.

22 Claims, 4 Drawing Sheets

(56) References Cited

U.S. PATENT DOCUMENTS

| | | | |
|---|---|---|---|
| 2004/0109271 A1* | 6/2004 | Takeda | 361/56 |
| 2007/0053120 A1* | 3/2007 | Gauthier et al. | 361/56 |
| 2007/0109697 A1* | 5/2007 | Huh | 361/56 |
| 2008/0007882 A1* | 1/2008 | Bernard et al. | 361/56 |
| 2008/0239599 A1* | 10/2008 | Yizraeli et al. | 361/56 |
| 2009/0201615 A1* | 8/2009 | Bernard et al. | 361/56 |
| 2010/0149701 A1* | 6/2010 | Drapkin et al. | 361/56 |
| 2011/0299202 A1* | 12/2011 | Cai et al. | 361/56 |
| 2013/0077195 A1* | 3/2013 | Stockinger | 361/56 |

OTHER PUBLICATIONS

Smith, J. et al., "A MOSFET Power Supply Clamp with Feedback Enhanced Triggering for ESD Protection in Advanced CMOS Technologies," EOS/ESD Symposium, Sep. 21-25, 2003, 9 pp.

Stockinger, M. et al., "Boosted and Distributed Rail Clamp Networks for ESD Protection in Advanced CMOS Technologies," EOS/ESD Symposium, Sep. 21-25, 2003, 10 pp.

* cited by examiner ately preferred embodi-
TRIGGER CIRCUIT AND METHOD OF USING SAME This application claims priority to Indian National Patent Application 3848/DEL/2011, which was filed Dec. 28, 2011 and is incorporated herein by reference.

TECHNICAL FIELD

The present invention relates generally to the triggering of electrostatic discharge clamps.

BACKGROUND

Electrostatic discharge (ESD) may result in a burst of charge being transferred into, across or out of a system. In semiconductor devices this burst of charge may cause irreparable damage and cause the system to fail.

Relatively large field effect transistors, usually N or P-type MOSFETs may be used to provide a low impedance path for the electrostatic discharge. Resistor-Capacitor triggered power clamps may be used to control the field effect transistors.

SUMMARY OF THE INVENTION

In accordance with a first aspect, there is provided a circuit comprising a discharge arrangement configured to discharge an electrostatic charge. The discharge arrangement has a discharge state. The circuit includes a first circuit configured to provide a pulse to the discharge arrangement when an electrostatic charge is sensed, the pulse causing said discharge arrangement to enter said discharge state. There is also a second circuit configured to maintain said discharge arrangement in said discharge state after said pulse has ended. There is also a third circuit configured to receive said pulse and to provide a delayed output to said discharge arrangement, the delayed output causing said discharge arrangement to exit said discharge state.

There is provided according to a second aspect an electrostatic discharge protection arrangement comprising at least one circuit having a discharge arrangement configured to discharge an electrostatic charge. The discharge arrangement has a discharge state. There is also a first circuit configured to provide a pulse to the discharge arrangement when the electrostatic charge is sensed. The pulse causes the discharge arrangement to enter the discharge state. There is also a second circuit configured to maintain the discharge arrangement in the discharge state after the pulse has ended, and a third circuit configured to receive the pulse and to provide a delayed output to the discharge arrangement, the delayed output causing the discharge arrangement to exit the discharge state.

There is provided according to a third aspect an integrated circuit comprising at least one circuit having a discharge arrangement configured to discharge an electrostatic charge. The discharge arrangement has a discharge state. There is provided a first circuit configured to provide a pulse to the discharge arrangement when the electrostatic charge is sensed, the pulse causing the discharge arrangement to enter the discharge state. A second circuit is configured to maintain the discharge arrangement in the discharge state after the pulse has ended. A third circuit is configured to receive the pulse and to provide a delayed output to the discharge arrangement, the delayed output causing the discharge arrangement to exit the discharge state.

There is provided according to a fourth aspect a trigger circuit comprising: a first circuit configured to provide a pulse to a clamp when an electrostatic charge is sensed, said pulse causing said clamp to enter said discharge state; a second circuit configured to provide a maintaining signal to maintain said clamp in said discharge state after said pulse has ended; and a third circuit configured to receive said pulse and to provide a delayed output to said clamp, said delayed output causing said clamp to exit said discharge state.

There is provided according to a fifth aspect a power clamp comprising: a clamp configured to discharge an electrostatic charge, said clamp having a discharge state; and a trigger circuit having: a first circuit configured to provide a pulse to a clamp when an electrostatic charge is sensed, said pulse causing said clamp to enter said discharge state; a second circuit configured to provide a maintaining signal to maintain said clamp in said discharge state after said pulse has ended; and a third circuit configured to receive said pulse and to provide a delayed output to said clamp, said delayed output causing said clamp to exit said discharge state.

There is provided according to a sixth aspect a method comprising: providing a pulse to a discharge arrangement when an electrostatic charge is sensed, said pulse causing said discharge arrangement to enter a discharge state; discharging said electrostatic charge via said discharge arrangement, maintaining said discharge arrangement in said discharge state after said pulse has ended; and causing said discharge arrangement to exit said discharge state after a delay.

There is provided according to a seventh aspect a method comprising: providing a pulse to a clamp when an electrostatic charge is sensed, said pulse causing said clamp to enter a discharge state; providing a maintaining signal to maintain said clamp in said discharge state after said pulse has ended; and providing a pulse causing said clamp to exit said discharge state after a delay.

There is provided according to an eighth aspect a circuit comprising: providing means for providing a pulse to a discharge means when an electrostatic charge is sensed, said pulse causing said discharge means to enter a discharge state; discharging means for discharging said electrostatic charge; maintaining means for maintaining said discharge means in said discharge state after said pulse has ended; and delaying means for causing said discharge arrangement to exit said discharge state.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
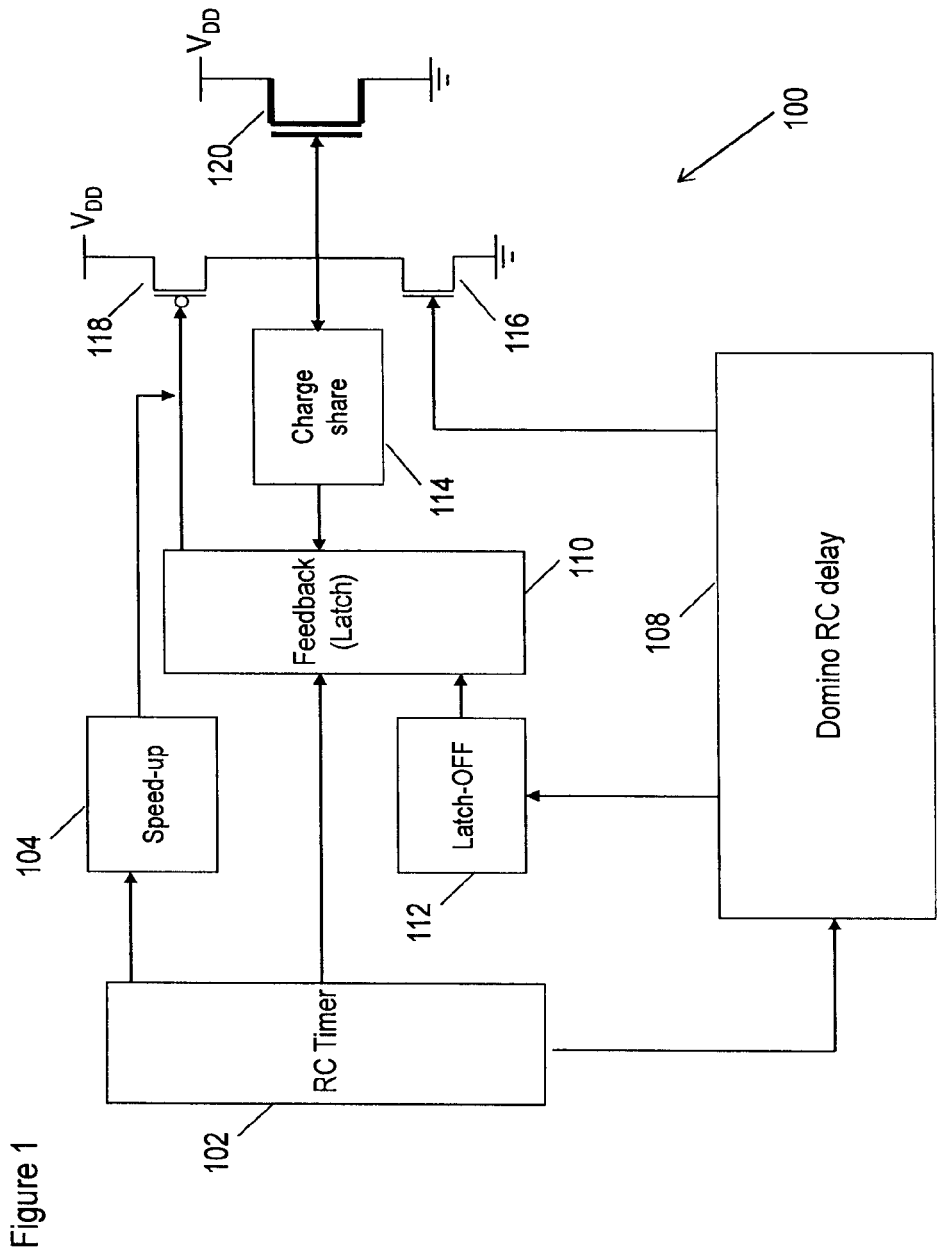
FIG. 1 shows a block diagram of a trigger circuit.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Before addressing the illustrated embodiments in detail, various embodiments and advantageous features thereof will be discussed generally in the following paragraphs.

Some embodiments provide for a circuit comprising: a discharge arrangement configured to discharge an electrostatic charge, said discharge arrangement having a discharge state; a first circuit configured to provide a pulse to said discharge arrangement when said electrostatic charge is sensed, said pulse causing said discharge arrangement to enter said discharge state; a second circuit configured to maintain said discharge arrangement in said discharge state after said pulse has ended; and a third circuit configured to receive said pulse and to provide a delayed output to said discharge arrangement, said delayed output causing said discharge arrangement to exit said discharge state.

The electrostatic charge may be received at at least one power rail. The circuit may be configured to receive power from said at least one power rail. The second circuit may be configured to receive a current from said discharge arrangement when the power provided by said at least one power rail drops below a threshold.

The third circuit may be further configured to: provide said delayed output to said second circuit. The second circuit may be configured to stop maintaining said discharge arrangement in said enabled state on receipt of said delayed output.

The second circuit may be configured to: receive said pulse from said first circuit; latch the value of said pulse after the pulse has ended; provide said latched value to said discharge arrangement; receive said delayed output from said third circuit; and reset the latched value on receipt of said delayed output.

The discharge arrangement may have a plurality of transistors wherein at least one of said transistors is wider than at least one other transistor, said at least one wider transistor being configured to discharge said electrostatic charge and said at least one other transistor being configured to control said at least one wider transistor. The plurality of transistors may be one of metal oxide semiconductor field effect transistors, junction field effect transistors, or field effect transistors.

The discharge arrangement may be configured to discharge said electrostatic charge when in said discharge state; and not discharge said electrostatic charge when in said non-discharge state.

Other embodiments provide for an electrostatic discharge protection arrangement comprising at least one circuit having: a discharge arrangement configured to discharge an electrostatic charge, said discharge arrangement having a discharge state; a first circuit configured to provide a pulse to said discharge arrangement when said electrostatic charge is sensed, said pulse causing said discharge arrangement to enter said discharge state; a second circuit configured to maintain said discharge arrangement in said discharge state after said pulse has ended; and a third circuit configured to receive said pulse and to provide a delayed output to said discharge arrangement, said delayed output causing said discharge arrangement to exit said discharge state.

Yet other embodiments provide for an aspect an integrated circuit comprising at least one circuit having: a discharge arrangement configured to discharge an electrostatic charge, said discharge arrangement having a discharge state; a first circuit configured to provide a pulse to said discharge arrangement when said electrostatic charge is sensed, said pulse causing said discharge arrangement to enter said discharge state; a second circuit configured to maintain said discharge arrangement in said discharge state after said pulse has ended; and a third circuit configured to receive said pulse and to provide a delayed output to said discharge arrangement, said delayed output causing said discharge arrangement to exit said discharge state.

The integrated circuit may comprise: at least one input; at least one output; and at least one circuit block; wherein: a respective one of said at least one circuits may be coupled to a respective one of each of said at least one input, at least one output and at least one circuit block.

Still other embodiments provide for a trigger circuit comprising: a first circuit configured to provide a pulse to a clamp when an electrostatic charge is sensed, said pulse causing said clamp to enter said discharge state; a second circuit configured to provide a maintaining signal to maintain said clamp in said discharge state after said pulse has ended; and a third circuit configured to receive said pulse and to provide a delayed output to said clamp, said delayed output causing said clamp to exit said discharge state.

Yet other embodiments provide for a power clamp comprising: a clamp configured to discharge an electrostatic charge, said clamp having a discharge state; and a trigger circuit having: a first circuit configured to provide a pulse to a clamp when an electrostatic charge is sensed, said pulse causing said clamp to enter said discharge state; a second circuit configured to provide a maintaining signal to maintain said clamp in said discharge state after said pulse has ended; and a third circuit configured to receive said pulse and to provide a delayed output to said clamp, said delayed output causing said clamp to exit said discharge state.

The power clamp of may be one of a large field effect transistor; a large grounded-gate N-type metal oxide semiconductor and a silicon controlled rectifier clamp.

In some embodiments, there is provided a method comprising: providing a pulse to a discharge arrangement when an electrostatic charge is sensed, said pulse causing said discharge arrangement to enter a discharge state; discharging said electrostatic charge via said discharge arrangement, maintaining said discharge arrangement in said discharge state after said pulse has ended; and causing said discharge arrangement to exit said discharge state after a delay.

The method may further comprise receiving said electrostatic charge at at least one power rail. The method may further comprise receiving said power from said at least one power rail. The method may further comprising receiving, a current from said discharge arrangement when the power provided by said at least one power rail drops below a threshold.

The method may further comprise: providing said delayed output from said third circuit to said second circuit from maintaining said discharge arrangement in said enabled state on receipt of said delayed output. The method may further comprise: receiving said signal, said pulse from said first circuit; latching the value of said pulse such that it is conversed after the pulse has ended; providing said latched value to said discharge arrangement to maintain said discharge arrangement in said discharging state; receiving said delayed output from said third circuit; and resetting said latched value on receipt of said delayed output. The method may further comprise discharging said electrostatic charge when in said discharge state.

Other method embodiments provide for providing a pulse to a clamp when an electrostatic charge is sensed, said pulse causing said clamp to enter a discharge state; providing a maintaining signal to maintain said clamp in said discharge state after said pulse has ended; and providing a pulse causing said clamp to exit said discharge state after a delay.

Additional embodiments provide for a circuit comprising: providing means for providing a pulse to a discharge means when an electrostatic charge is sensed, said pulse causing said discharge means to enter a discharge state; discharging means for discharging said electrostatic charge; maintaining means for maintaining said discharge means in said discharge state after said pulse has ended; and delaying means for causing said discharge arrangement to exit said discharge state.

Shrinking technology challenges have resulted in a need for trigger circuits to trigger larger field effect transistors (BIGFET) in Resistor-Capacitor (RC) coupled or dynamic triggered electrostatic discharge (ESD) networks.

A dynamic triggered ESD network may consist of at least one dedicated ESD rail, at least one trigger circuit, at least one Clamp device and at least two diodes in a back to back configuration. There are many types of ESD network for example: lumped networks, distributed networks or boosted networks.

It may be advantageous for trigger circuits to have fast response times. Voltage overshoots during an initial part of a clamp's response due to a lag between the application of a pulse and the completion of the turning on mechanism of the trigger circuit may damage the field effect transistors. This may be because the shrinking of the circuit technology has caused a reduction in the gate oxide breakdown voltage (Vbox). A slower response may result in higher voltage overshoots. Therefore reduced turn on times may be useful for deep sub-micron technologies.

Trigger circuits may be repeated a number of times within a design. Therefore, it may be beneficial to have compact trigger circuit designs which require minimal area in order to be physically implemented. It may also be beneficial for trigger circuit designs to consume minimal current in order to reduce leakage currents and power consumption.

System-on-Chip designs and products are getting more complex. The parasitic effects which may occur due to other elements within these systems may affect the performance of trigger circuits. In particular, parasitic effects such as the resistance and inductance of power supply rails may cause problems such as mistriggering, sticking, overvoltage and oscillatory triggering. These problems may result in the functional failure of all or part of the integrated circuit. Therefore it may also be beneficial for trigger circuits to be resilient to parasitic effects.

Complex system-on-chip designs for demanding applications may require very fast supply ramp rates (for example less than 1 μs). Therefore some trigger circuits may be configured to provide good filtering characteristics for one or more of their conditions of operation.

Various trigger circuits have been proposed to incorporate above mentioned qualities. Some of them use static or dynamic feedback techniques. These circuits are compact and use latch (static feedback) circuitry or two-timing (dynamic feedback) circuitry to implement a delay of for example approximately 1 μs and good filtering characteristics.

However static feedback circuitry may require very careful pre-silicon simulation and the chip may need to be turned off when not in use in order to avoid the possibility of the latch mistriggering.

A different approach to trigger circuits has used a dual path control of BIGFETs with an RC triggered inverter chain to turn on the clamp and a domino like multi RC circuit to turn off the clamp. These circuits may be immune from the parasitic effects and, in the event of a mistrigger, the duration of a time-out may be shorter. However, the filtering characteristics and response or turn-on times may be inferior to those of feedback or latch based circuits.

FIG. 1 shows a trigger circuit 100 configured to provide a signal to a large N-type MOSFET 120. This is a BIGFET. A power clamp may comprise the trigger circuit 100 and the BIGFET 120. The trigger circuit 100 comprises a resistor-capacitor timer (RC timer) 102 which is configured to provide an output which is received as an input by a speed up circuit 104. The RC timer 102 is also configured to provide an output which is received as an input at a domino resistor capacitor delay circuit (domino RC delay) 108. The RC Timer 102 is also configured to provide an output which is received as an input at a feedback circuit or latch 110.

The domino RC delay 108 is configured to provide an output which is received as an input by a latch off circuit 112. The domino RC delay 108 is further configured to provide an output which is received as an input at the gate of a first N-type field effect transistor 116.

The latch off circuit 112 is configured to provide an output which is received as an input by the feedback circuit 110. The feedback circuit 110 is configured to provide an output which is received as an input by the gate of a P-type field effect transistor 118. The gate of the P-type field effect transistor 118 is also configured to receive as an input an output provided by the speed up circuit 104. The source of the P-type field effect transistor 118 is configured to receive a voltage. The drain of the P-type field effect transistor 118 is configured to provide an output which is received as an input by a charge share circuit 114, the drain of the field effect transistor 116 and the large N-type field effect transistor 120. The source of first N-type field effect transistor 116 is configured to provide a path to a ground voltage. The charge share circuit 114 is configured to provide an output which is received as an input by the feedback circuitry 110.

The drain of the large N-type field effect transistor 120 is configured to receive a voltage Vdd. The source of the large N-type field effect transistor 120 is configured to provide a path to a ground voltage.

In FIG. 1, the turn on path of the clamp may be implemented by the feedback circuit 110 triggered by the RC timer circuit 102, while the turn off path may be implemented by the domino RC circuit 108. The output of this domino RC circuit 108 is used as an input to a latch off circuit 112 which turns off the feedback latch circuitry 110, which in turn turns off the P-type field effect transistor 118 driving the gate of the large N-type field effect transistor 120. At the same time a second signal is generated by domino RC chain circuit 108 to turn on the first N-type field effect transistor 116 driving the large N-type field effect transistor 120. The extra stages in the path may add a delay to the trigger circuit 100 and hence make the response time slower. Therefore the speed-up circuit 104, which is driven by RC timer 102, is used in order to increase the response time of the trigger circuit 100 by providing a parallel path to the gate of the P-type field effect transistor 118. In addition to this, the charge share circuit 114 may prevent the early discharge of the feedback 110 output as the electrostatic discharge pulse decays.

Figure 3:
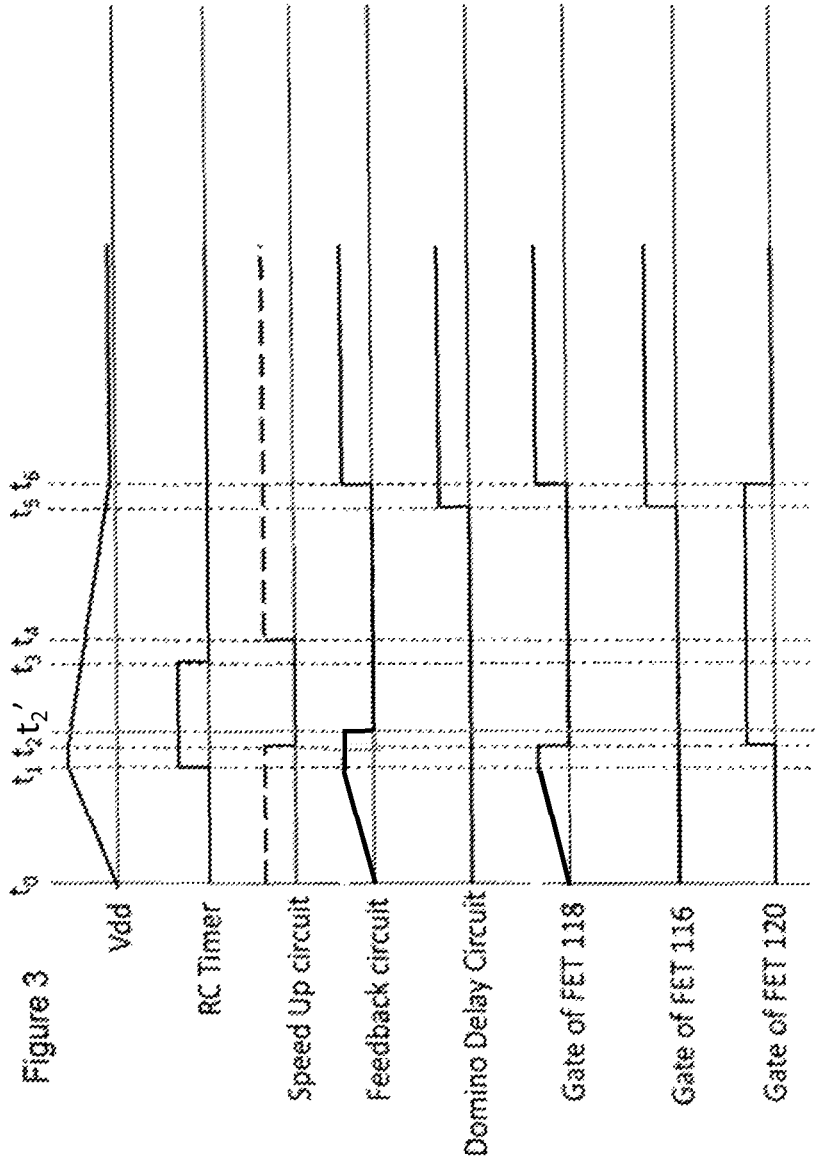
FIG. 3 shows a timing diagram of an embodiment of the trigger circuit of FIG. 1.

The operation of the trigger circuit 100 is shown in more detail in FIG. 3, which shows a timing chart of some embodiments. The outputs of the RC timing circuit 102, the speed up circuit 104, the feedback circuit 110 and the domino RC delay 108 are shown. The gate voltages of the three FETs 116, 118 and 120 are also shown.

At time $t_0$ as Vdd is low, the voltage outputs of the RC timing circuit 102 and the domino delay circuit 108 are low. The voltage output by the speed up circuit is in a do not care state (depicted using a dotted line). The voltage at the gate of FET 116 and FET 120 is nominally low. The FET 120 does not provide any means for electrostatic discharge. The voltage output by the feedback circuit 110 and the voltage at the gate of FET 118 follows the voltage level of Vdd, as shown in FIG. 1 and explained further below.

Between $t_0$ and $t_1$, a charge burst which may be due to an ESD event causes the voltage of Vdd to rise. At $t_1$, the voltage level of Vdd has increased such that the RC timer 102 provides a rising edge pulse. This rising edge pulse is transmitted across the speed-up circuit 104 and to the gate of the FET 118 at $t_2$ in the form of a falling edge pulse with the same duration as the RC timer output pulse. This results in FET 118 being turned on which, in turn, turns on FET 120 which provides a path to ground for the electrostatic discharge. The voltage level of Vdd starts to decrease after $t_2$ as the electrostatic charge is discharged through the FET 120. One skilled in the art will recognize the desire to have the delay between the start time $t_1$ of the rising edge pulse and the start time $t_2$ of the falling edge pulse be as small as possible in order to trigger FET 120 as quickly as possible.

At $t_2'$ the pulse from the RC timer 102 has propagated through the feedback circuit 110 and the output provided by the feedback circuit is low. As the feedback and speed-up circuit outputs are tied together, the signal received by the gate of FET 118 is the summation of the output of the speed up circuit and the feedback circuit. In other words, the gate of FET 118 remains low provided that either the output of speed-up circuit 104 or the output of feedback circuit 110 is low. This results in a longer duration active low pulse which results in the FET 120 being switched on if the speed up circuit 104 and/or the feedback circuit 110 is outputting a low voltage.

At ($t_3$ the pulse from the RC timer 102 finishes. A short delay time thereafter, at $t_4$, the pulse from speed-up circuit 104 also finishes. As addressed above, because the output from both speed-up circuit 104 and feedback circuit 110 are tied together, the voltage provided by the speed up circuit 104 and the feedback circuit 110 to the gate of FET 118 remains low due to the latch provided by the feedback circuit 110, meaning the gate of BIGFET 120 is kept high. The charge share circuit 114 enables the nodes within the feedback circuit to be held at the correct logic values as the voltage level Vdd decays due to its discharge via the BIGFET 120. This means that the gate voltages of FETs 118 remains low and 120 remain high and the FET 120 continues to discharge the electrostatic charge.

At $t_5$, the pulse from the RC timing circuit 102 has propagated through the domino RC delay circuit 108. The delayed pulse is output and switches on the FET gate 116. The delayed pulse is inverted by the latch off circuit 112 (not shown).

At $t_6$ the inverted delayed pulse has propagated through the feedback circuit 110 and the output of the feedback circuit returns to a high value. This results in the gate voltage of FET 118 returning to a high value which switches off FET 118. Since FET 118 is OFF and FET 116 is ON the gate voltage of FET 120 returns to a low value and FET 120 also turns off at $t6$. This results in the FET 120 no longer discharging the electrostatic charge and Vdd remains at an acceptable low voltage.

The voltage decays at Vdd as the discharge takes place and FET 116 becomes weaker due to reduction in gate voltage. The resistor 244 (see FIG. 2) pulls the gate of FET 120 down to low.

As can be seen from FIG. 3, the speed-up circuit 104 provides the pulse to the gate of the FET 118 more quickly than the feedback circuit 110. The feedback circuit holds the pulse such that the on voltage is maintained at the gate of the FET 118 until the domino delay 108 provides the delayed inverted pulse which switches off the FET 118.

Figure 2:
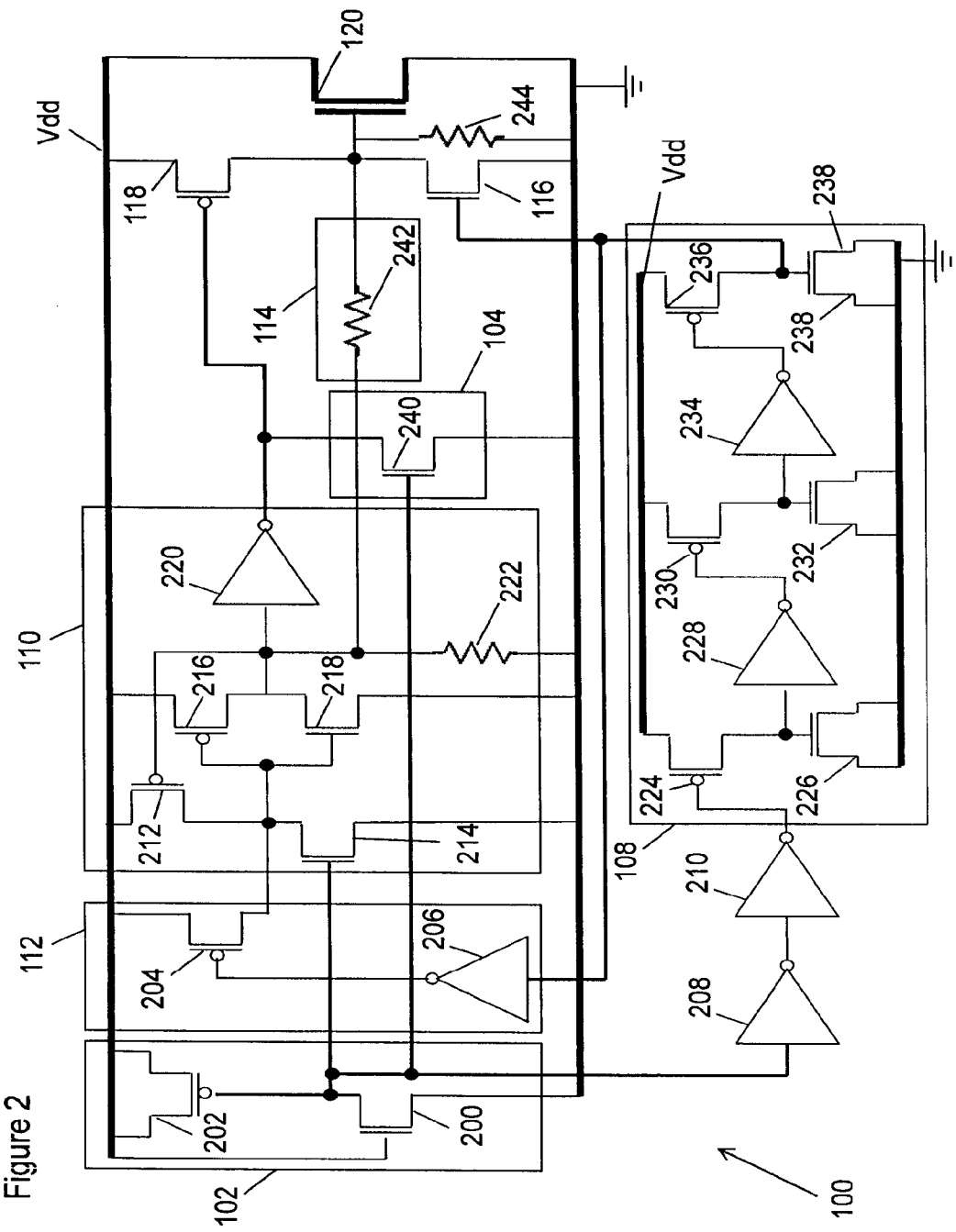
FIG. 2 shows a circuit implementation of a trigger circuit.

FIG. 2 shows an embodiment of the elements of the trigger circuit 100. Those parts which are referenced by the same reference number operate in generally the same way as described in relation to FIG. 1 unless otherwise stated.

The power clamp 100 comprises a RC timer 102 which is configured to provide an output which is received as an input by a speed up circuit 104. The RC timer 102 is also configured to provide an output which is received as an input at a domino delay circuit 108. The RC timer 102 is also configured to provide an output which is received as an input at a feedback latch 110.

The RC timer 102 comprises an N-type field effect transistor (FET) 200 and a P-type field effect transistor (FET) 202. The drain and source of the P-type FET 202 are connected to a voltage source Vdd. The gate of the P-type FET 202 is configured to receive an output provided by the drain of the N-type FET 200. The gate of the N-type FET 200 is connected to the voltage source Vdd. The source of FET 200 is configured to provide a path to a ground voltage. The outputs which the RC timer provides to the speed-up circuitry 104, the feedback circuitry and the domino RC delay 108 are provided by the drain of the N-type FET 200.

Two buffer inverters 208 and 210 are provided between the output of the RC timer 102 and the input of the domino RC delay 108. The domino RC delay 108 is configured to provide an output which is received as an input by a latch-off circuit 112. The domino RC delay 108 is further configured to provide an output which is received as an input at the gate of a first N-type field effect transistor 116.

The input to the domino RC delay 108 is received at the gate of a P-type FET 224. The source of the FET 224 is configured to receive the voltage Vdd. The drain of the FET 224 is configured to provide an output which is received as an input at the gate of an N-type FET 226 and an inverter 228. The source and drain of the FET 226 are each configured to provide a path to ground. The inverter 210 is configured to provide an output which received as an input at the gate of a P-type FET 230. The source of the FET 230 is configured to receive the voltage Vdd. The drain of the FET 230 is configured to provide an output which is received as an input at the gate of an N-type FET 232 and an inverter 234. The source and drain of the FET 232 are each configured to provide a path to ground. The inverter 234 is configured to provide an output which is received as an input at the gate of a P-type FET 236. The source of the FET 236 is configured to receive the voltage Vdd. The drain of the FET 236 is configured to provide an output which is received as an input at the gate of an N-type FET 238. The source and drain of the FET 238 are each configured to provide a path to ground. The drain of the FET 236 is further configured to provide the outputs of the domino RC delay which are received as inputs by the gate of the N-type FET 116 and the latch off circuitry 112.

The latch off circuit 112 is configured to provide an output which is received as an input by the feedback circuit 110. The latch off circuitry 112 comprises an inverter 206 which is configured to receive the input to the latch off circuitry 112. The inverter 206 is configured to provide an output which is received as an input by the gate of a P-type FET 204. The source of the FET 204 is configured to receive the voltage Vdd. The drain of the FET 204 is configured to provide an output to the feedback circuitry 110.

The feedback circuit 110 is configured to provide an output which is received as an input by the gate of a P-type field effect transistor 118. The feedback circuitry 110 is configured to receive as an input the output provided by the latch off circuitry 112 at the drain of an N-type FET 214. The feedback circuitry 110 is configured to receive as an input the output provided by the RC timer 102 at the gate of FET 214. The source of the FET 214 is configured to provide a path to ground. The drain of the FET 214 is configured to provide an output which is received as an input at the drain of a P-type FET 212. The output provided by the drain of the FET 214 is also received as an input by the gate of a P-type FET 216. The output provided by the drain of the FET 214 is also received as an input by the gate of an N-type FET 218. The source of the FET 212 is configured to receive the voltage Vdd. The gate of the FET 212 is configured to receive as an input the output of the drain of the FET 218. The output of the drain of the FET 218 is also received as an input by the drain of the FET 216. The output of the drain of the FET 218 is also received as an input by a resistor 222, an inverter 220 and further configured to receive as an input an output provided by the charge share circuit 242. The source of the FET 218 is configured to provide a path to ground. The source of the FET 216 is configured to receive a voltage Vdd. The resistor 222 is configured to provide a path to ground. The inverter 220 is configured to provide the output of the feedback circuitry 110 which is received as an input by the FET 118.

The gate of the P-type field effect transistor 118 is also configured to receive as an input an output provided by the speed up circuit 104. The speed-up circuitry 104 comprises an N-type FET 240. The input to the speed up circuitry 104 is received at the gate of the FET 240. The source of the FET 240 is configured to provide a path to the ground voltage. The drain of the FET 240 is configured to provide the output of the speed-up circuitry 104.

The source of the P-type field effect transistor 118 is configured to receive a voltage Vdd. The drain of the P-type field effect transistor 118 is configured to provide an output which is received as an input by a charge share circuit 114, the N-type field effect transistor 116 and the gate of a large N-type field effect transistor 120. The source of first N-type field effect transistor 116 is configured to provide a path to a ground voltage.

The charge share circuit 114 is configured to provide an output which is received as an input by the feedback circuitry 110. The charge share circuitry 114 comprises a resistor 242 configured to receive as an input the output from the drain of the FET 116 and to provide an output to the feedback circuitry 110 which is as an input by the drain of the FET 218.

The drain of the large N-type field effect transistor 120 is configured to receive a voltage Vdd. The source of the large N-type field effect transistor 120 is configured to provide a path to a ground voltage. A resistor 244 is configured to receive as an input the output provided by the source of the FET 116 and to provide a path to a ground voltage.

Referring again to FIG. 3, the charge burst at t0 causes the voltage at Vdd to rise. This causes the RC timing circuit 102 formed by FET 200 and FET 202 to output a short pulse at the drain of FET 200 between t1 and t3. NFET 200 functions as a resistor and FET 202 acts as a MOS capacitor. During the fast voltage transition between t0 and t1 at Vdd the FET 202 acting as capacitor couples the voltage across the resistor FET 200 and a pulse is produced.

When the gate of NFET 240 of the speed up circuit 104 receives the rising edge of the pulse at t1, the NFET 240 is switched on. This results in the source of NFET 240 providing a low voltage to the gate of PFET 118. This switches on the PFET 118. As PFET 118 is switched on and NFET 116 is switched off, the NFET 120 is switched on and discharges any electrostatic current which is present in the system.

As the Voltage at Vdd decays due to the discharge of current through the NFET 120, the high voltages at some nodes within the feedback circuit 110 may fall below the switching threshold of the FETs. This may result in the feedback circuit 110 coming out of its latched state and switching off PFET 118, and so switching off NFET 120 prematurely. In some embodiments a charge share circuitry 114 provides a high voltage back to the feedback circuit 110. This results in inverter 220 maintaining the gate voltage of FET 118 at a low voltage from time $t_2'$ through time $t_5$. The signal from the charge share circuit also switches off PFET 212. Meanwhile the gate of NFET 214 has received the rising edge of the pulse and is switched on. As the PFET 212 is switched off, the drain of NFET 214 is at a low voltage which turns on PFET 216 and turns off PFET 218. When the RC timer produces the falling edge at t3, the voltage at the output of inverter 220, and so the voltage at the gate of FET 118, is held at a low voltage by the charge share circuit even though the falling edge of the pulse has switched off the NFET 240 of the speed up circuit 104. This means that the FET 118 remains switched on so the FET 120 remains switched on.

At t3, the falling edge provided by the RC timer begins to propagate through the domino relay circuit 108. The falling edge is first buffered through two buffer inverter stages 208 and 210. The falling edge is the output from buffer 210 and turns on PFET 224. This causes the gate of NFET 226 to charge to the value of Vdd and produces a rising edge at gate of NFET 226. This rising edge is again inverted through inverter 228 which turns on PFET 230. The three stages of the domino relay function in the same manner and produce a rising edge output at t5.

The rising edge provided by the output of the domino delay circuit switches on NFET 116 and is inverted by inverter 206 in the latch off circuit 112 to provide a low voltage at the gate of PFET 204. The low voltage at the gate of PFET 204 switches PFET 204 on and provides a high voltage output to the NFET 214 of the feedback circuit 110. As PFET 212 is switched off, NFET 204 provides a high voltage output which switches off PFET 216 and switches on NFET 218. The input to the inverter is now at a low voltage and so the inverter outputs a high voltage at t6 which switches off PFET 118. As NFET116 is switched on the voltage at the gate of NFET 120 falls to a low value. This results in NFET 120 switching off and electrostatic charge is no longer discharged.

Figure 4:
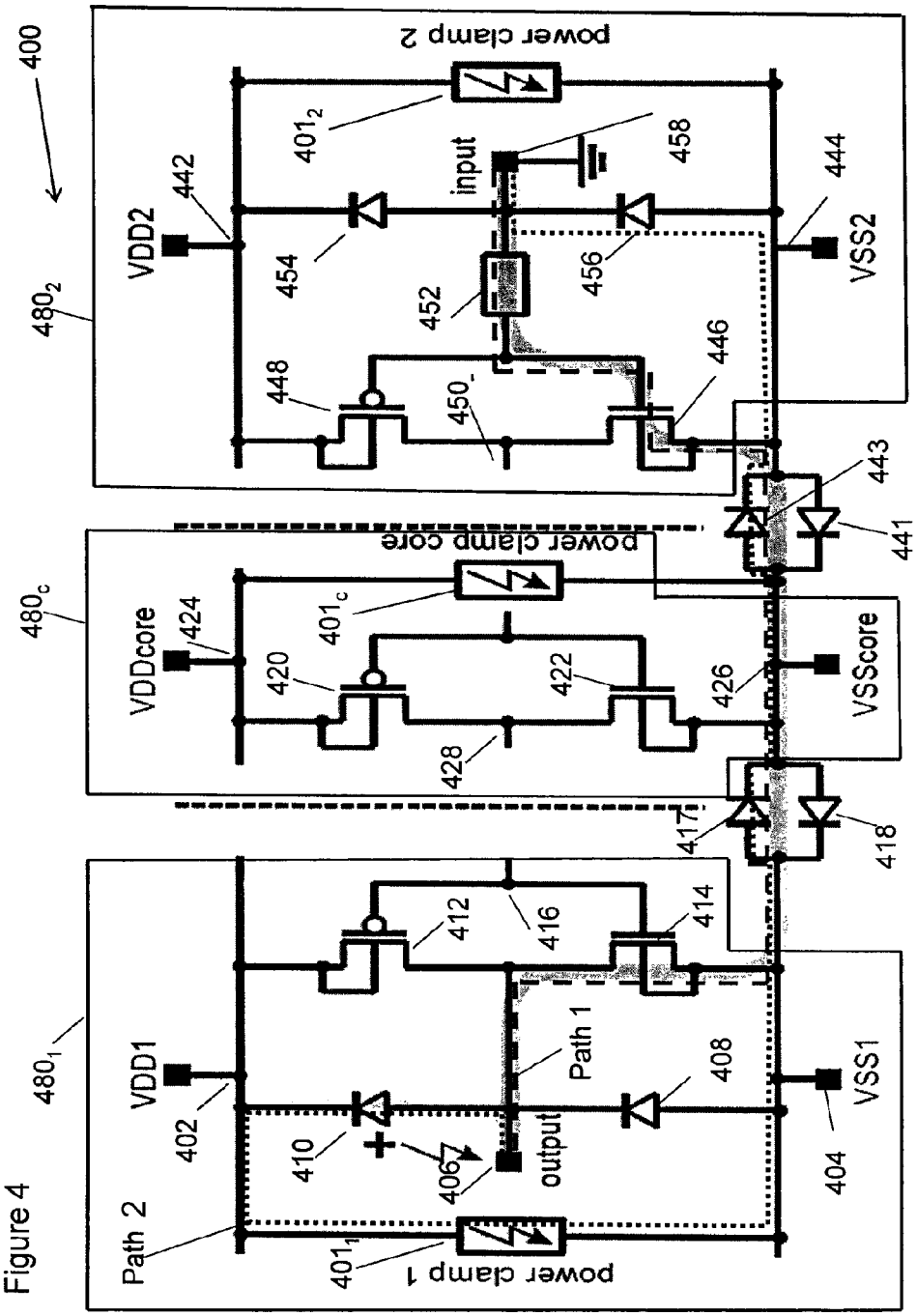
FIG. 4 shows an IC comprising power clamps.

FIG. 4 shows a power clamp 401 within an integrated circuit 400. The power clamp 401 may comprise the trigger circuit 100 and the BIGFET 120. The integrated circuit 400 comprises an input circuit 480𝑎, a core circuit 480c and an output circuit 4801. The output circuit 4801 comprises voltage rail VDD1 402 configured to provide a voltage which is received as an input to power clamp 1 4011. Power clamp 1 4011 is further configured to receive as an input a voltage provided by voltage rail VSS1 404. Voltage rail VDD1 402 is further configured to provide an input to the source of a P-type FET 412 and the cathode of diode 410. The gate of FET 414 and the gate of an N-type FET 412 are configured to receive as and input a signal 416 from other circuitry within IC 400. The drains of FET 414 and FET 412 are configured to provide an output 406 from the integrated circuit 400. The output 406 is also received as an input at the anode of diode 410 and at the cathode of diode 408. The anode of diode 408 and the source of FET 412 are configured to receive as an input the voltage provided by voltage rail VSS1 404.

The core circuit 480c comprises voltage rail VDDcore 424 configured to provide a voltage which is received as an input to the core power clamp 401c. The core power clamp 401c is configured to receive as an input a voltage provided by a second voltage rail VSScore 426. Voltage rail VDDcore 424 is further configured to provide an input to the source of a P-type FET 420. The gate of FET 420 and the gate of an N-type FET 422 are configured to receive as an input a signal 440 from surrounding circuitry. The drains of FET 420 and FET 422 are configured to provide an output 428 to other circuitry within IC 400. The source of FET 422 is configured to receive as an input the voltage provided by voltage rail VSScore 426.

Input circuit 4802 comprises voltage rail VDD2 442 configured to provide a voltage which is received as an input to power clamp 2 4012. Power clamp 2 4012 is configured to receive as an input a voltage provided by voltage rail VSS2 444. Voltage rail VDD2 442 is further configured to provide an input to the source of a P-type FET 448 and the cathode of diode 454. The gate of FET 448 and the gate of an N-type FET 446 are configured to receive as an input a signal which is provided as an output from resistor 452. Resistor 452 is configured to receive as an input a signal 458 which is received as an input to the integrated circuit 400. The drains of FET 448 and FET 446 are configured to provide an output 450 to other circuitry within IC 400. The input 458 is also received as an input at the anode of diode 454 and at the cathode of diode 456. The anode of diode 456 and the source of FET 446 are configured to receive as an input the voltage provided by voltage rail VSS2 444.

Voltage rail is VSS1 configured to provide an input voltage which is received at the anode of diode 417 and at the cathode of diode 418. Voltage rail VSScore is configured to provide an input voltage which is received at the of cathode diode 417 and at the anode of diode 418.

Voltage rail VSS2 is configured to provide an input voltage which is received at the anode of diode 441 and at the cathode of diode 443. Voltage rail VSScore is configured to provide an input voltage which is received at the of cathode diode 441 and at the anode of diode 443. During electrostatic discharge events, the electrostatic charge will be discharged via inputs or outputs of the integrated circuit 400 which have a ground voltage.

FIG. 4 shows path 1 through the IC 400 which is a path that a current would take through the IC 400 without power clamps and the associated diodes during an electrostatic discharge event. In this scenario electrostatic charge is applied to the output 406 and the input 458 has a ground voltage. The electrostatic charge is received as an input at the drain of FET 414 from the output 406. The electrostatic charge is then output to the voltage rail VSS1 from the source of FET 414. The current then passes directly from voltage rail VSS1 to voltage rail VSScore and directly from voltage rail VSScore to voltage rail VSS2. The current is then received as an input at the source of FET 446 and output by the gate of FET 446 and output from the input 458 of the IC 400 via resistor 452. This means that the electrostatic charge has passed through circuitry associated with both the input and outputs of the IC and may have damaged the circuitry and/or the data being processed by the circuitry.

FIG. 4 also shows path 2 through the IC 400 which is the path that the same current would take through the IC 400 with power clamp and associated diodes during the same electrostatic discharge event. The current passes through diode 410 to the voltage rail VDD1. It is then discharged through power clamp 1 4011 to voltage rail VSS1 404. The current is then passed from voltage rail VSS1 via diode 417 to voltage rail VSScore and from voltage rail VSScore via diode 443 to voltage rail VSS2. The current the passes through diode 456 and is discharged via the output. The power clamp may result in the electrostatic discharge bypassing the circuitry of the IC 400 and so may avoid damage occurring to the circuitry and/or the data being processed by the circuitry.

In some embodiments, the voltage Vdd may change linearly as shown in FIG. 3. In some embodiments the voltage Vdd may change non-linearly. In some embodiments the voltage Vdd may decay to a low voltage of a value greater than zero as shown in FIG. 3. In some embodiments the voltage Vdd may decay to a ground voltage. Some embodiments may be configured to discharge electrostatic charge which has built up on a positive or negative voltage rail.

In some embodiments the RC timer 102 may be implemented using the FET 202 as capacitor and the FET 200 as resistor. The feedback loop 110 may be implemented to create a latch triggered by the RC timer 102. The FET 240 connected to RC timer 102 is used for speed-up circuit 104. This speed-up circuit 104 may increase the drive of the FET 118 during initial phase of the pulse because during the initial phase of the pulse the voltage may not have risen to a substantial value. The gate-drain capacitive coupling within FET 118 may cause the gate of FET118 to rise as Vdd rises. Thus in some embodiments the speed up circuit may be configured to keep the gate of FET 118 closer to ground and hence may provide a larger overdrive. The inverter 206 and FET 204 of the latch off circuitry 112 may be used to de-latch the feedback loop 110 after the domino RC delay chain 108 has timed out. Hence the FET 118 may turn on and the FET 116 may turn off which may result in the discharging of the large FET gate 120. The resistor 242 may be used in the charge sharing circuit 114 to charge an intermediate latch node within the feedback loop. In some embodiments this may prevent the latch node from discharging prematurely during the pulse.

In some embodiments BIGFET may be of the same type of transistor as used in a circuit design. In some embodiments the length of the BIGFET may be the same as that of surrounding transistors. In some embodiments the width of the BIGFET may be much larger than the width of surrounding transistors. The width of the BIGFET may be in order of 3000 to 6000 μm whilst the width of other transistors within the design may be less than 400 μm. Thus the width of the BIGFET may be a minimum of 7.5 to 15 times larger than the width of the other transistors within the design.

In some embodiments the width of the BIGFET may be chosen based on the amount of current which is required to pass through the BIGFET in order to discharge the electrostatic charge. In some embodiments the BIGFET may be implemented using as a two-finger MOSFET or a multi-finger MOSFET. In some embodiments the BIGFET may be implemented from a plurality of units.

In some embodiments the ESD network trigger circuit may be repeated a number of times to provide uniform and strong triggering for the BIGFET. In some embodiments the BIG-FET may be lumped in one part of the integrated circuit or semiconductor chip. The BIGFET may be distributed across all or part of an integrated circuit or semiconductor chip.

Some embodiments may achieve the speed and response time of feedback based circuits whilst providing immunity from the parasitic effects due to pressure, voltage and temperate (PVT) variations and the power supply rail resistance and inductance. Some embodiments may be suitable applications requiring very fast supply ramp rates due to their improved filtering characteristics. In some embodiments the field effect transistors may be MOSFETs or, JFETs.

Some embodiments of the trigger circuit may be configured to trigger a variety of clamp structures. For example the trigger circuit may trigger a BIGFET, grounded-gate NMOS (GGNMOS) and silicon controlled rectifier (SCR) clamps. In some embodiments small miller capacitors may be placed between the input and output of the inverters 228, 234 of the domino RC delay circuit. These capacitors may reduce the area required to implement some embodiments by increasing the effective time constant of the chain.

In some embodiments the trigger circuit 100 may be configured to periodically enable the large field effect transistor 120 in order to enable the field effect transistor to discharge electrostatic current. Some embodiments may provide a dual path control mechanism for large FETs.

Some embodiments may be configured to control an N-type large discharge transistor which may discharge a positive electrostatic charge. Some embodiments may be configured to control a P-type large discharge transistor which may discharge a negative electrostatic charge. Some embodiments may be configured to control one or more N-type and/or P-type transistors. Some embodiments may provide all or part of a dynamic electrostatic discharge protection strategy. Some embodiments may be used as part of the input-output (I/O) ring design of a chip.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit comprising:
    a discharge arrangement configured to discharge an electrostatic charge, the discharge arrangement having a discharge state;
    a first circuit configured to receive a second pulse and to provide a first pulse to the discharge arrangement when the electrostatic charge is sensed, the first pulse causing the discharge arrangement to enter the discharge state;
    a second circuit configured to receive the second pulse and maintain the discharge arrangement in the discharge state after the first pulse has ended;
    a third circuit configured to receive the second pulse and to provide a delayed output signal to both the discharge arrangement and the second circuit, the delayed output signal operable to cause the discharge arrangement to exit the discharge state; and
    a fourth circuit configured to sense the electrostatic charge and to generate the second pulse when the electrostatic charge is sensed.

2. The circuit of claim 1, wherein said electrostatic charge is received on at least one power rail.

3. The circuit of claim 2, wherein the circuit is configured to receive power from the at least one power rail.

4. The circuit of claim 3, wherein the second circuit is configured to receive a current from the discharge arrangement when the power provided by said at least one power rail drops below a threshold.

5. The circuit of claim 1, wherein the third circuit is further configured to provide the delayed output signal to the second circuit, and the second circuit is configured to stop maintaining the discharge arrangement in the discharge state on receipt of the delayed output signal.

6. The circuit of claim 1, wherein the second circuit is configured to:
    receive said second pulse from the fourth circuit,
    latch the value of the second pulse after the first pulse has ended,
    provide the latched value to the discharge arrangement,
    receive said delayed output signal from the third circuit, and
    reset the latched value on receipt of the delayed output signal.

7. The circuit of claim 1, wherein the discharge arrangement has a plurality of transistors, and wherein at least one of the transistors is wider than at least one other transistor, the at least one wider transistor being configured to discharge the electrostatic charge, and the at least one other transistor being configured to control the at least one wider transistor.

8. The circuit of claim 7, wherein the plurality of transistors are of a type selected from the group consisting of metal oxide semiconductor field effect transistors, junction field effect transistors, and field effect transistors.

9. The circuit of claim 1, wherein the discharge arrangement is configured to discharge the electrostatic charge when in the discharge state, and not discharge the electrostatic charge when not in the discharge state.

10. An integrated circuit comprising:
    a circuit of claim 1;
    an input coupled to the circuit;
    an output coupled to the circuit; and
    a circuit block coupled to the circuit.

11. A trigger circuit comprising:
    a first circuit configured to receive a second pulse and to provide a first pulse to a discharge arrangement when an electrostatic charge is sensed, the first pulse causing the discharge arrangement to enter a discharge state;
    a second circuit configured to receive the second pulse and to provide a maintaining signal to maintain the discharge arrangement in the discharge state after the second pulse has ended, wherein the second circuit comprises a latch configured to latch the second pulse and generate the maintaining signal based on the latched second pulse;
    a third circuit configured to receive the second pulse and to provide a delayed output to the discharge arrangement and to the second circuit, the delayed output causing the discharge arrangement to exit the discharge state and causing the second circuit to reset the latch; and
    a fourth circuit configured to sense the electrostatic charge and to generate the second pulse when the electrostatic charge is sensed.

12. A power clamp comprising:
    a discharge arrangement configured to discharge an electrostatic charge, the discharge arrangement having a discharge state; and
    a trigger circuit comprising:
        a first circuit configured to receive a second pulse and to provide a first pulse to the discharge arrangement when an electrostatic charge is sensed, the first pulse causing the discharge arrangement to enter the discharge state;
        a second circuit configured to receive the second pulse and to provide a maintaining signal to maintain the discharge arrangement in the discharge state after the second pulse has ended, wherein the second circuit comprises a latch configured to latch the second pulse and generate the maintaining signal based on the latched second pulse;
        a third circuit configured to receive the second pulse and to provide a delayed output to the discharge arrangement and to the second circuit, the delayed output causing the discharge arrangement to exit the discharge state and causing the second circuit to reset the latch; and
        a fourth circuit configured to sense the electrostatic charge and to generate the second pulse when the electrostatic charge is sensed.

13. The power clamp of claim 12, wherein the discharge arrangement comprises one of a large field effect transistor, a large grounded-gate N-type metal oxide semiconductor and a silicon controlled rectifier clamp.

14. A method comprising:
    sensing an electrostatic charge;
    generating a pulse when the electrostatic charge is sensed;

providing an activation signal to a discharge arrangement based on the pulse, the activation signal causing the discharge arrangement to enter a discharge state;

discharging the electrostatic charge via the discharge arrangement when in the discharge state;

providing a maintaining signal to the discharge arrangement, the maintaining signal operable to maintain the discharge arrangement in the discharge state after the pulse has ended; and causing the discharge arrangement to exit the discharge state after a delay.

15. The method of claim 14, further comprising receiving the electrostatic charge at at least one power rail.

16. The method of claim 15, further comprising receiving power from the at least one power rail.

17. The method of claim 16, further comprising receiving a current from the discharge arrangement when the power provided by the at least one power rail drops below a threshold.

18. The method of claim 14, further comprising providing a delayed output after the delay to cease maintaining the discharge arrangement in the discharge state on receipt of the delayed output.

19. The method of claim 14 further comprising:

receiving the pulse;

latching the value of the pulse such that it is maintained after the pulse has ended;

providing the latched value to the discharge arrangement to maintain the discharge arrangement in the discharging state, wherein the latched value comprises the maintaining signal;

receiving a delayed output signal; and resetting said latched value on receipt of the delayed output signal.

20. A method comprising:

providing a first pulse when an electrostatic charge is sensed;

providing a third pulse to a discharge arrangement when the first pulse is received by a first circuit, the third pulse causing the discharge arrangement to enter a discharge state;

receiving the first pulse at a latching circuit;

latching the value of the first pulse with the latching circuit such that the value of the first pulse is maintained after the first pulse has ended;

providing the latched value to the discharge arrangement to maintain the discharge arrangement in the discharging state;

receiving a delayed signal at the latching circuit;

resetting said latched value on receipt of the delayed signal; and receiving a second pulse at the discharge arrangement simultaneous to receiving the delayed signal at the latching circuit, the second pulse causing the discharge arrangement to exit the discharge state.

21. A circuit comprising:

a discharge arrangement configured to discharge an electrostatic charge, the discharge arrangement having a discharge state;

a pulse circuit configured to sense the electrostatic charge and to generate an activation pulse when the electrostatic charge is sensed;

an activation circuit coupled to the pulse circuit and the discharge arrangement, wherein the activation circuit is configured to receive the activation pulse and to provide an enable signal to the discharge arrangement based on the activation pulse, the enable signal causing the discharge arrangement to enter the discharge state;

a feedback circuit coupled to the pulse circuit and the discharge arrangement, wherein the feedback circuit is configured to receive the activation pulse and maintain the discharge arrangement in the discharge state after the activation pulse has ended; and a delay circuit coupled to the pulse circuit, the feedback circuit, and the discharge arrangement, wherein the delay circuit is configured to receive the activation pulse and to generate a delay signal based on the activation pulse, wherein the delay signal is operable to cause the discharge arrangement to exit the discharge state and to reset the feedback circuit.

22. A circuit comprising:

an RC timer circuit coupled to a first supply rail and a second supply rail, wherein the RC timer circuit comprises a timer output terminal;

a feedback latch coupled to the first supply rail and the second supply rail, wherein the feedback latch comprises a reset terminal, an activation terminal coupled to the timer output terminal, a latch output terminal, and a charge supply terminal;

a speed-up circuit coupled to the timer output terminal, the latch output terminal, and the second supply rail;

a first activation transistor comprising a first drain/source coupled to the first supply rail, a second drain/source coupled to a discharge control terminal, and a gate coupled to the latch output terminal;

a second activation transistor comprising a first drain/source coupled to the discharge control terminal, a second drain/source coupled to the second supply rail, and a gate coupled to a delay output terminal;

a discharge transistor comprising a first drain/source coupled to the first supply rail, a second drain/source coupled to the second supply rail, and a gate coupled to the discharge control terminal;

a charge share circuit coupled to the discharge control terminal and the charge supply terminal;

a domino delay circuit coupled to the timer output terminal and the delay output terminal; and a latch reset circuit coupled to the first supply rail, the reset terminal, and the delay output terminal.

* * * * *